United States Patent [19]
Leto

[11] 3,991,561
[45] Nov. 16, 1976

[54] DUAL-FUEL FEED SYSTEM FOR A GAS TURBINE ENGINE

[75] Inventor: Anthony Leto, Franklin Lakes, N.J.

[73] Assignee: Curtiss-Wright Corporation, Wood-Ridge, N.J.

[22] Filed: June 19, 1975

[21] Appl. No.: 588,323

[52] U.S. Cl. .................... 60/39.46 R; 60/39.74 B; 431/60; 431/181; 137/604; 137/606
[51] Int. Cl.² ........................ F02C 7/22; F17D 1/04
[58] Field of Search ............... 60/39.74 B, 39.74 R, 60/39.46 R, 261, 39.06; 137/561 A, 606, 604; 431/60, 8, 181; 239/61, 62, 396, 433

[56] References Cited
UNITED STATES PATENTS

| | | | |
|---|---|---|---|
| 2,637,334 | 5/1953 | Starkey | 60/39.28 R |
| 2,771,741 | 11/1956 | Barnard | 60/39.06 |
| 2,854,819 | 10/1958 | Walker | 60/39.46 R |
| 2,931,429 | 4/1960 | Brown | 60/39.46 |
| 3,139,724 | 7/1964 | Nerad et al. | 60/39.06 |
| 3,267,676 | 8/1966 | Sneeden | 60/39.71 |
| 3,517,679 | 6/1970 | Williamson | 60/39.28 R |
| 3,766,734 | 10/1973 | Jones | 60/39.28 R |

FOREIGN PATENTS OR APPLICATIONS

| | | | |
|---|---|---|---|
| 595,733 | 7/1959 | Italy | 137/561 A |
| 723,110 | 2/1955 | United Kingdom | 60/39.74 R |

*Primary Examiner*—Carlton R. Croyle
*Assistant Examiner*—Robert E. Garrett
*Attorney, Agent, or Firm*—Arthur Frederick; Victor D. Behn

[57] ABSTRACT

The dual-fuel feed system for a gas turbine engine, having a plurality of fuel nozzles arranged to effect admixture of air and fuel in a combustor of the engine for combustion of fuel, comprises a fuel feed conduit means communicating with each of the fuel nozzles and separate sources of different fuels and flow control means for alternating flow of fuel from one source or the other to the fuel nozzles.

4 Claims, 2 Drawing Figures

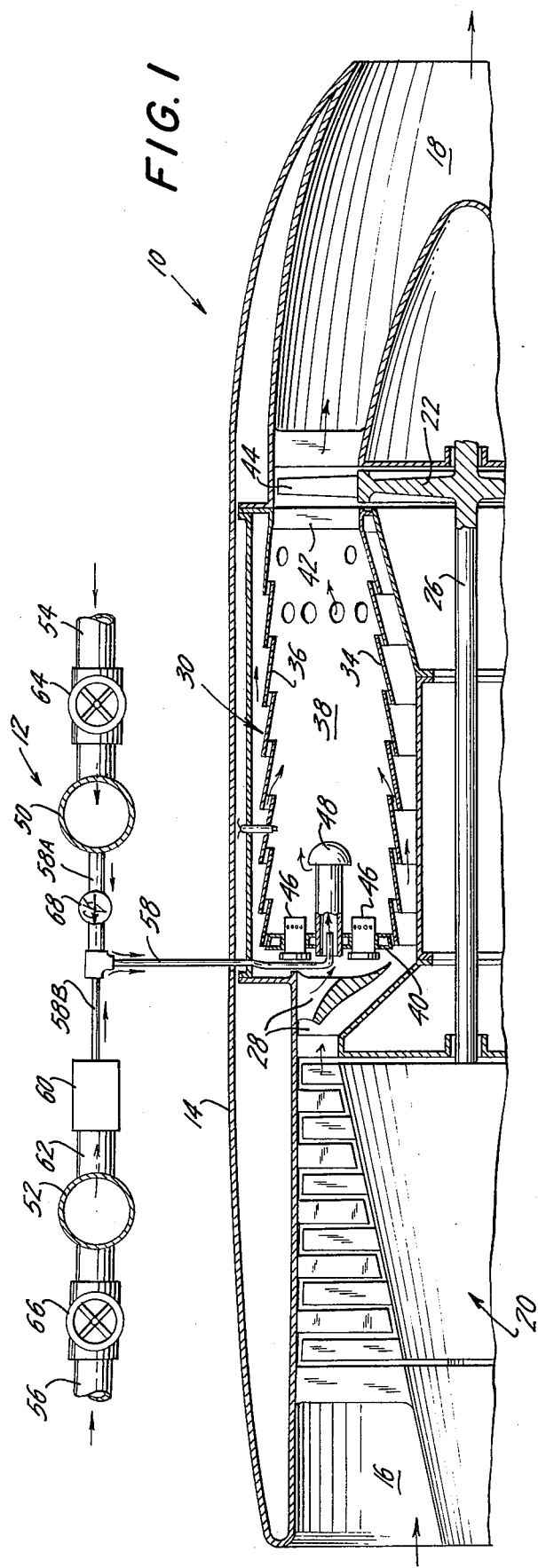
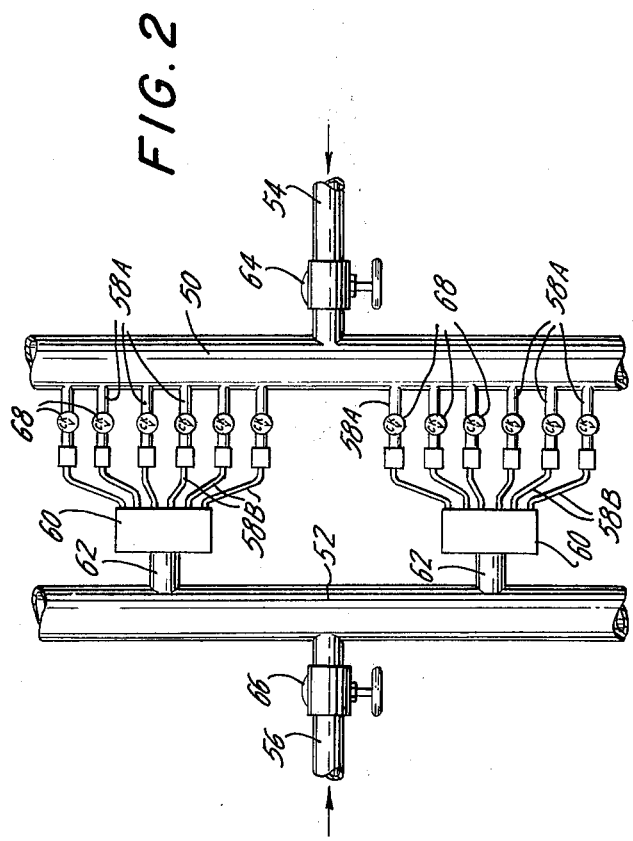

DUAL-FUEL FEED SYSTEM FOR A GAS TURBINE ENGINE

The invention relates to gas turbine engines and, more specifically, a dual-fuel feed system for a gas turbine engine whereby operation of the gas turbine engine can be effected by combustion of alternately, at least, two different fluid fuels.

BACKGROUND OF THE INVENTION

In gas turbine engines, liquid fuel is introduced into the combustion chamber either by means of fuel spray discharge system or by fuel vaporization system. In the fuel vaporization system, such as exemplified in the U.S. patents to Sneeden, U.S. Pat. No. 3,267,676, dated Aug. 23, 1966 and Sevcik, U.S. Pat. No. 2,884,759, dated May 5, 1959, fuel vaporizing tubes are employed without, or in conjunction with, caps to receive and admix fuel and air and, at least, partially effect vaporization of fuel. Heretofore, to convert an industrial stationary gas turbine engine, having a fuel vaporization system, from liquid fuel burning to the burning of gaseous fuel, such as natural gas, it has been necessary to disassemble the entire fuel feed system, including fuel nozzles or tubes and the liquid fuel manifold, and replace them with a new gaseous fuel manifold and fuel nozzles. This procedure, to take advantage of the availability and/or low cost of liquid and gaseous fuels, is complex, costly and results in relatively long shut-down periods for the engine during conversion. It also results, when conversion is made to gas, in lack of durability and reliability since the usual modifications frequently result in failure of the fuel nozzles due to fretting corrosion. This lack of durability resulted from wear of elements added in the modification for gas operation to effect a seal between the fuel-feed tube and the vaporizer fuel nozzle, which sealing elements were thought to be required for sustaining combustion of the gas.

Accordingly, it is an object of the present invention to provide, for a gas turbine engine, a dual-fuel feed system which can be converted quickly and easily from the burning of one of two fluid fuels to the other fluid fuel and back again.

Another object of this invention is to provide, for a gas turbine engine, a dual-fuel feed system in which the heretofore necessity for disassembly and reassembly and the accompanying relatively long shut-down to effect conversion of the gas turbine engine to the burning of a different fluid fuel is eliminated.

It is a further object of the present invention to provide a dual-fuel feed system for a gas turbine engine, which system eliminates the heretofore reduction in engine reliability as a result of the conversion from one fluid fuel to another.

SUMMARY OF THE INVENTION

The invention, therefore, contemplates a dual-fuel feed system for a gas turbine engine having a plurality of fuel nozzles arranged to effect admixture of fuel and air for combustion of the fuel in a combustion zone of the engine, the system comprising first and second manifolds connected respectively to a source of first fluid, such as natural gas, and a source of second fluid fuel, such as a blend of gasoline and kerosene, and fuel feed conduit means communicating with each of said fuel nozzles and with the first and second manifolds to pass from the latter first and econd fluid fuels to the fuel nozzles. A means (not shown), such as a pump, is provided to pressurize the first and second fluid fuels, as for example, to a pressure about 125 psi for liquid fuel and 225 psi for natural gas to effect flow of the fluid fuels to the fuel nozzles and into the combustion zone. A flow control means is provided to alternately cause flow of first fluid fuel and second fluid fuel to the fuel nozzles.

In a narrower aspect of the invention, the fuel feed conduit means comprises a plurality of bifurcated pipes with each of the branches in communication with a manifold and the main or trunk pipe in communication with a fuel nozzle. A check valve disposed in the branch adjacent the first manifold is also provided to allow flow of first fluid fuel from the first manifold and prevent flow of second fluid fuel in the opposite direction into the first manifold.

BRIEF DESCRIPTION OF THE DRAWINGS

The invention will be more fully understood from the following description when considered in connection with the accompanying drawings in which:

FIG. 1 is a fragmentary, longitudinal, cross-sectional view, somewhat schematic, through a gas turbine engine having the dual-fuel feed system according to this invention, and FIG. 2 is a developed view of part of the dual-fuel feed system shown in FIG. 1.

DESCRIPTION OF PREFERRED EMBODIMENT

Now referring to the drawings, the reference number 10 generally designates a gas turbine engine which is provided with a dual-fuel feed system 12, according to this invention.

As schematically shown in FIG. 1, gas turbine 10 is of conventional construction having the usual air compressor, combustor and gas turbine components. More specifically, the gas turbine engine comprises a duct-like housing 14 having, at one end, an air inlet 16 and at the opposite end, an exhaust outlet discharge port 18. A vane type air compressor 20 is journaled for rotation within housing 14 adjacent air inlet 16 to receive air from the latter and is driven by a rotor 22 of a gas turbine 24 through a coaxially disposed shaft 26. The compressor 20 discharges compressed air into a compressor outlet passage 28. A combustor 30 is disposed adjacent compressor outlet passage 28 and comprises two spaced annular liners 34 and 36 to form a combustion chamber or zone 38, closed at one end by a wall 40 and open at the opposite end, to discharge combustion gases through stator guide vanes 42 into impingement against rotor vanes 44.

To effect combustion of fuel in combustion zone 38, the combustor is provided with suitable means for passing compressed air from compressed air passage 28 into the combustion zone. For this purpose, combustor 30 has a plurality of cup-shaped air baffles 46 mounted in wall 40 adjacent to a plurality of fuel nozzles 48 of the vaporizer tube type, such as fully disclosed in the aforesaid U.S. patent to Sneeden, U.S. Pat. No. 3,267,676, which fuel nozzles 48 are also mounted on wall 40. In a typical gas turbine engine, there may be as many as 36 fuel nozzles 48. To provide for flow of fuel to each of the fuel nozzles 48, dual-fuel system 12, according to this invention, is provided.

As shown, dual-fuel system 12 comprises a first manifold 50 of ring-shape and a second manifold 52 of ring-shape disposed substantially coaxially around engine housing 14. A first fuel supply pipe 54 is connected to first manifold 50 to conduct a first fluid fuel, such as a natural gas (methane) from a suitable source thereof (not shown). Similarly, a second fuel supply pipe 56 is connected to second manifold 52 to conduct a second fluid fuel, such as a liquid fuel consisting of a blend of gasoline and kerosene, from a suitable source thereof (not shown). A fuel feed conduit means, including a plurality of pipes 58 (one for each fuel nozzle 48) is connected to communicate with first manifold 50 and second manifold 52 and thereby conduct, alternately, a first and a second fluid fuel to each of the fuel nozzles. Each pipe 58 is of T shape with one branch 58A connecting with first manifold 50 and another branch 58B connecting with second manifold 52 via a flow divider or secondary manifold 60 and pipes 62, which feature will be more fully discussed hereinafter. A flow control means schematically represented by valves 64 and 66 in supply pipes 54 and 56, respectively, is provided to alternately effect flow of first and second fluid fuels through supply pipes 54 and 56 and, hence, through pipes 58 via first and second manifolds 50 and 52 and secondary manifolds 60. The flow control means may form part of any suitable gas turbine automatic control system, as exemplified in the U.S. patents to Scheerer, U.S. Pat. No. 3,691,759 and Harrison, U.S. Pat. No. 3,844,112 to control flow of either the first or second fluid fuels to the fuel nozzles.

In stationary installations, where the longitudinal axis of gas turbine engine 10 is substantially horizontal, there can be as much as a 2 psi pressure difference between a liquid second fluid fuel at fuel nozzles 48 in the upper portion of the gas turbine engine and such liquid fuel at fuel nozzles 48 in the lower portion of gas turbine engine 10. Accordingly, it is necessary to provide in such applications, a means to insure uniform distribution of a liquid second fluid fuel to the fuel nozzles. As shown schematically in the drawings, the present invention contemplates such distribution means to be a plurality of circumferentially spaced fuel flow dividers or secondary manifolds 60, each of which are connected by way of pipe 62 to second manifold 52. Each secondary manifold 60 may distribute fuel flow to any suitable number of pipes 58, as for example, with each secondary manifold 60 connected to six branches 58B the number of secondary manifolds 60 would be six for an engine having 36 fuel nozzles 48. The secondary manifolds 60 may be of any suitable type capable of providing uniform fuel flow rate and pressure to all fuel nozzles 48. One such device is manufactured by Bendix Corporation, Southfield, Mo., and identified as a Fuel Distributor Unit, Part No. 185-099. Where the first fluid fuel is a gaseous fuel, flow distributing means is unnecessary because the relatively light density of the gaseous fuel results in a negligible pressure differential for which compensation is not required.

The fuel feed system 12 also includes any suitable means for pressurizing the first and second fluid fuels. Such means may be pumps (not shown) which are sized to effect delivery of fluid fuel to fuel nozzles 48 at an elevated pressure, as for example, liquid fuel at about 125 psi and gaseous fuel at about 225 psi.

A check valve 68 is disposed in each branch 58A of pipe 58 to permit flow of first fluid fuel from manifold 50, through branch 58A to fuel nozzles 48, but prevent flow, in the opposite direction, of the second fluid fuel through branch 58A into manifold 50 when the gas turbine engine is operating on combustion of the second fluid fuel. The secondary manifold 60 serves, in addition to the fuel distribution function, to prevent flow of the first fluid fuel into second manifold 52 so that check valves in branches 58B of pipe 58 are not necessary.

In operation of gas turbine engine 10, valves 64 and 66 are positioned so that when one valve is open, the other valve is closed. Assuming operation is to be effected by combustion of the first fluid fuel, valve 64 is opened while valve 66 is moved to a closed position. With valve 64 open, pressurized first fluid fuel flows from a source thereof (not shown) into first manifold 50, via supply pipe 54. From first manifold 50, the first fluid fuel flow into each of the branches 58A of pipe 58 and thence into fuel nozzles 48. The fuel is then admixed with compressed air entering fuel nozzles 48 from passage 28 and discharged into combustion chamber 38.

When it is desired to switch from the first fluid fuel to the combustion of second fluid fuel, valves 64 and 66 are respectively closed and opened. In these positions of valves 64 and 66, a pressurized second fluid fuel only is conducted from a suitable source thereof to fuel nozzles 48 by way of supply pipe 56, second manifold 52, pipes 62 to secondary manifolds 60 and pipes 58.

It is therefore believed now readily apparent that the present invention provides a dual-fuel feed system for a gas turbine engine which can achieve quickly, easily and inexpensively, the switching from the combustion of one fluid fuel to another. It is a dual-fuel feed system which provides a high degree of gas turbine operating reliability since the factory assembly of the system remains intact during the entire operative life of the engine.

Although but one embodiment has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:
1. A dual-fuel feed system for a gas turbine engine having a housing and a plurality of vaporizer type fuel nozzles arranged in spaced, circumferential relation to each other within the housing and around the longitudinal axis of the engine, which nozzles effect admixture of fuel and air in a combustion chamber means of the engine, the dual-fuel feed system comprising:
   1. a first ring-shaped manifold extending exteriorly of the engine housing and generally coaxially with respect to the longitudinal axis of the engine and being connected to communicate with a source of pressurized gaseous fluid fuel;
   2. a second ring-shaped manifold extending exteriorly of the engine housing and generally coaxially with respect to the longitudinal axis of the engine and being connected to communicate with a source of pressurized liquid fuel;
   3. a plurality of segmental secondary manifolds arranged exteriorly of the engine housing and in circumferential relationship to each other and generally coaxial with the longitudinal axis of the engine;
   4. conduit means connected to said second manifold and to each of said secondary manifolds to pass liquid fuel to the secondary manifolds;
   5. a plurality of fuel feed conduits;

6. each of said fuel feed conduits having one portion thereof extending through the engine housing and being connected to communicate with said first manifold and with one of the secondary manifolds and with one of the vaporizer fuel nozzles to provide gaseous and liquid fuel flows from the respective first manifold and secondary manifold to the vaporizer fuel nozzle; and
7. flow control means for alternating flow of gaseous and liquid fuels through each of said plurality of fuel feed conduits to the vaporizer fuel nozzle associated therewith.

2. The apparatus of claim 1 wherein said secondary manifolds function to effect substantially uniform distribution of liquid fuel to the fuel supply conduits.

3. The apparatus of claim 1 wherein a check valve means is provided in each of the fuel feed conduits for permitting flow of gaseous fuel from the associated first manifold toward and to the associated vaporizer fuel nozzle and for preventing flow of liquid fuel in a direction from an associated secondary manifold toward and into said associated first manifold.

4. The apparatus of claim 1 wherein each of said fuel feed conduits is bifurcated to connect with a secondary manifold and said first manifold and with an associated fuel nozzle.

* * * * *